United States Patent [19]

Gaenssle

[11] Patent Number: 4,969,105

[45] Date of Patent: Nov. 6, 1990

[54] GASKET COMPRESSION CONTROL METHOD HAVING TENSION-RELATED FEEDBACK

[75] Inventor: Heinz Gaenssle, Union Lake, Mich.

[73] Assignee: Ingersoll-Rand Company, Woodcliff Lake, N.J.

[21] Appl. No.: 189,334

[22] Filed: May 2, 1988

[51] Int. Cl.[5] .............................................. G05D 17/02

[52] U.S. Cl. ...................................... 364/508; 81/467; 73/862.23

[58] Field of Search .................. 364/508; 73/161, 761, 73/862.23, 862.21; 81/467, 470

[56] References Cited

U.S. PATENT DOCUMENTS

| | | | |
|---|---|---|---|
| 4,106,176 | 8/1978 | Rice et al. | 364/508 |
| 4,211,120 | 7/1980 | Tambini | 73/761 |
| 4,280,380 | 7/1981 | Eshghy | 81/470 |
| 4,333,220 | 6/1982 | Aspers | 81/467 |
| 4,400,785 | 8/1983 | Wallace et al. | 364/508 |
| 4,685,050 | 8/1987 | Polzer et al. | 364/508 |

*Primary Examiner*—Parshotam S. Lall
*Assistant Examiner*—Michael Zanelli
*Attorney, Agent, or Firm*—Robert F. Palermo; Walter C. Vliet; Arthur N. Trausch

[57] ABSTRACT

When tensioning a gasketed joint, the drive system applies rotational force to a threaded fastener while the monitor and control unit continuously compares a torque-related variable to a shutoff point. When the shutoff point is reached the control system reduces the drive system power, preferably to zero. After a preselected time pause the drive system is re-energized and applies another torque application until the torque-related variable again reaches the shutoff point. When the gasket is adequately compressed so that further torque applications cause insignificant increases in gasket compression, the tensioning operation is terminated. Feedback is provided by tension-related variables such as incremental angle of turn and/or incremental elapsed time of the torque application to determine when the tensioning cycle is complete.

16 Claims, 6 Drawing Sheets

GASKET COMPRESSION CONTROL METHOD HAVING TENSION-RELATED FEEDBACK

BACKGROUND OF THE INVENTION

This invention relates to fastener tightening systems for gasketed joints. More specifically it relates to a torque applying system having tension related feedback for controlling and monitoring the tightening of a threaded fastener joint which includes a gasket.

When pressure is applied to a gasket by a fastener such as a bolt tightened to a specific torque, the gasket tends to compress under pressure. The compression of the gasket under pressure relieves the clamping force on the gasket supplied by the fastener. This can result in the loss of gasket sealing and/or loose fasteners after a short period of time.

A gasket of a given material has a rate of compression that is a function of the applied pressure. Gaskets are typically used as seals between two surfaces that are secured to each other by fasteners such as bolts. In presently known systems, fasteners are tightened to a specific torque or rotated to a specified angle of turn thereby causing pressure to be applied to the gasket. When a specific torque or a specified angle is reached the fastener driving device is turned off. However, even though the fastener tightening process is terminated, the gasket will continue to compress until the gasket's resistance to flow under pressure equals the pressure produced by the tensioned fastener. The net result is that over a short period of time, the tension originally applied by a fastener may be reduced substantially, often to 60% or less of the original tension value. This loss of fastener tension in present known tightening systems results in loose fasteners and ineffective gasket seals.

Various tightening systems and methods have been employed to overcome the undesirable effects of gasket relaxation. A first method is the sustained power method. This method tightens a fastener to a selected torque limit and then maintains power on the drive system at a level sufficient to maintain the torque level over a predetermined period of time. The method achieves some success because as the gasket flows and fastener tension relaxes, the drive system attempts to turn the fastener in order to hold fastener tension at the desired level.

Another method is the power ramp method. Slowly increasing torque is applied to the fastener up to the desired torque level. The fastener will turn to follow the compression rate of the gasket.

Another method is the cyclic torque pulse method as described in U.S. Pat. No. 3,886,822 for example. An initial torque at a level somewhat below the desired final torque is continuously applied. A series of torque applications whose peaks are approximately equal to the desired final torque are then applied.

Another method is the torque pulse method as recently described in U.S. patent application Ser. No. 048,442 filed May 11, 1987 titled "Gasketed Joint Tightening Means and Method" and assigned to the same assignee as the present invention. The torque pulse method applies a user selected number of equal amplitude torque pulses to the gasketed joint each followed by a time pause of substantially reduced power. The system provides for ongoing compensation for gasket compression by repeatedly tightening the fastener using a predefined torque shutoff level. Control is provided by controlling the number of torque pulses or the total elapsed time in which the pulses are applied.

The major disadvantage of all the gasket tightening strategies currently in use is the complete lack of feedback related to relaxation of the gasket being compressed. Present methods, with the exception of the torque pulse system noted above, use overall time as a basis for determining adequate tightening, i.e., they make the assumption that if a fixed amount of pressure is applied to a gasket for a fixed time period, the gasket will be adequately compressed. Overall time is not a reliable indicator of gasket compression. Most of these systems use torque as a control for gasket compression. Torque determines the clamping force applied to a gasket, but torque alone is not a reliable indicator of gasket compression, i.e., the gasket may still compress or flow after the torque application ceases.

SUMMARY OF THE INVENTION

It is accordingly an object of this invention to provide a threaded fastener tightening system which is capable of reliably providing the desired clamping force to a gasketed joint.

It is another object of the invention to provide a system that provides feedback to control the tightening process.

It is another object of the invention to provide a system that uses tension-related feedback from the fastener to adequately compress the gasket so as to provide a good seal and a tightened joint.

It is a further object of the invention to provide a system to monitor the tightening process so as to provide diagnostic information related to fastener tension and gasket compression.

In accordance with the present invention, when tensioning a gasketed joint, the drive system applies rotational force to a threaded fastener while the monitor and control unit continuously compares a torque-related variable to a shutoff point. When the shutoff point is reached the control system reduces the drive system power, preferably to zero. After a preselected time pause the drive system is re-energized and applies another torque application until the torque-related variable again reaches the shutoff point. When the gasket is adequately compressed so that further torque applications cause insignificant increases in gasket compression, the tensioning operation is terminated. Feedback is provided by tension-related variables such as incremental angle of turn and/or incremental elapsed time of the torque application to determine when the tensioning cycle is complete.

These and other objects of the invention will become apparent from the following.

DESCRIPTION OF THE PREFERRED EMBODIMENT

Figure 1:
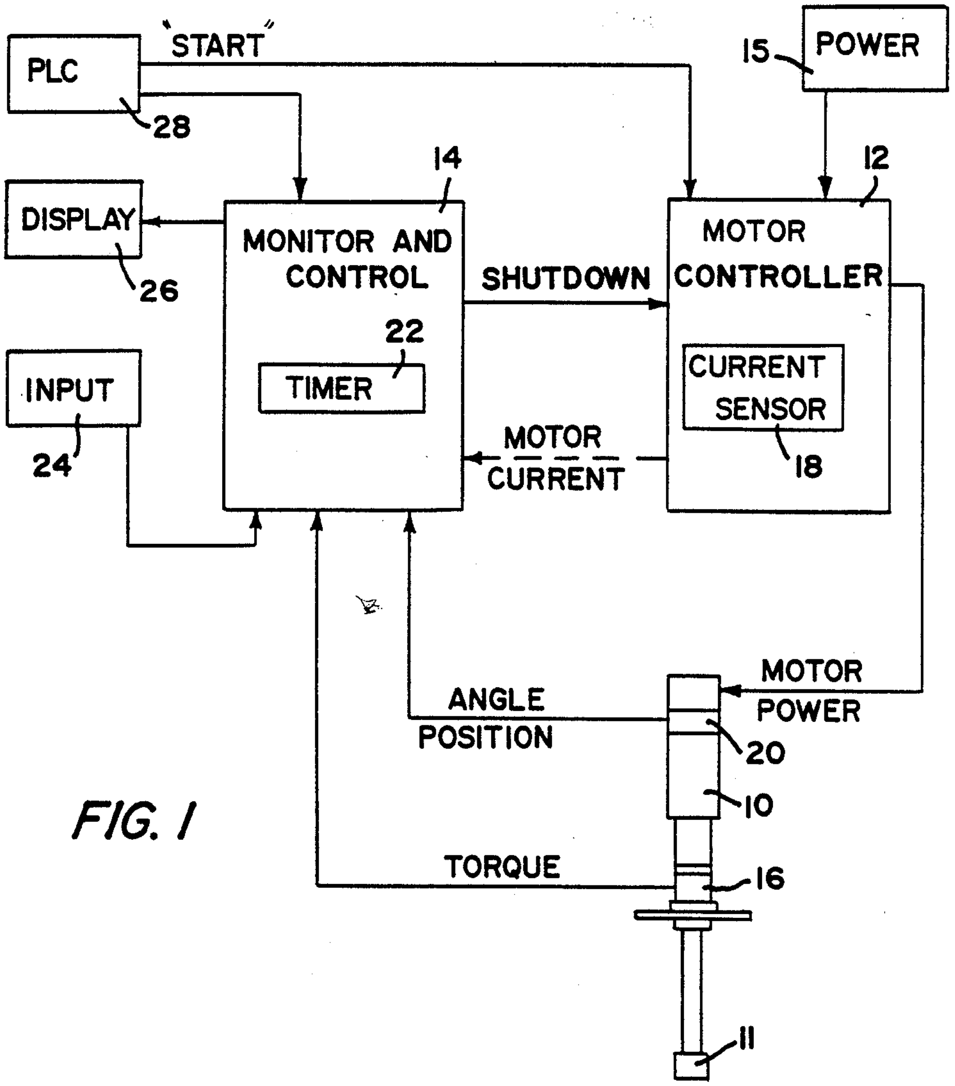
FIG. 1 is a schematic illustration of a tightening system according to the present invention.

Referring to the drawings and in particular FIG. 1, the preferred embodiment of a power torquing system with tension related feedback according to the present invention will be described.

The system includes a drive unit 10, a motor controller unit 12 and a monitor and control unit 14. In the preferred embodiment, digital processors are used for units 12 and 14, although analog devices could also be used. The drive unit 10 may be an air motor or an electric motor spindle module. The power source 15 may be high pressure air or electrical energy. Torque is transferred to the fastener by drive socket 11 on the drive unit.

To measure a torque-related variable a torque detector 16 such as a torque transducer is provided for detecting the tightening torque applied by the drive unit. For electric motors, the torque-related variable can alternatively be determined by measuring the electric current drawn by the motor since the current is proportional to the torque applied. An electric current sensor 18 can be provided in the motor controller unit 12 for this purpose.

To measure a tension-related variable, an angle of turn detector 20 such as an angle encoder is provided for detecting the incremental angle of turn of the fastener. Another tension-related variable, the incremental elapsed time of a torque application may be measured using a timer 22, for example in the monitor and control unit 14.

The torque-related and tension-related variables are readily separable since the torque applied and the electric current drawn by the motor can be changed by lubrication or lack thereof (friction) in the joint. The tension-related variable, which may, for example, be angle of turn or elapsed time of torque application, is not influenced by friction but is merely a function of the fastener thread and the mechanical properties of the fastener, the gasket, and the joint components.

The monitor and control unit 14 preferably includes a feature designed to distinguish a designated torque threshold before initiating subsequent torque and tension-related measurements, thus avoiding distortions associated with low torque. The system includes an input device 24 such as a hand held terminal for entering user selectable control and monitoring parameters into the unit 14. A display unit 26 is provided for data output.

Typically a number of fasteners are arranged in a pattern about a gasket perimeter to clamp the gasketed joint together. For example the bolt pattern of a transmission housing cover may include sixteen or more bolts. All of the fasteners are tightened in one operation using a power head (not shown) which has multiple drive units 10 corresponding to the number and pattern of the bolts. Overall control of the power head and all the individual monitor and control units 14 and motor controllers 12 is provided by a programmable logic control 28.

Figure 2:
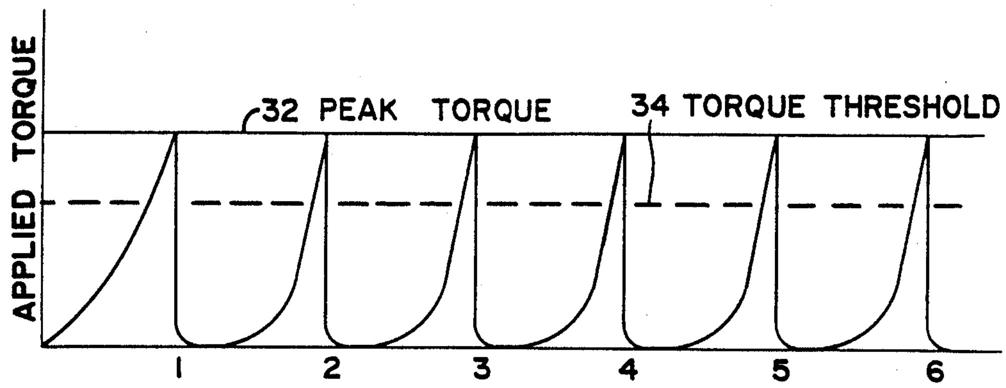
FIG. 2 is a graph showing the measured torque over six torque applications according to the invention.

During a typical tightening operation according to the present invention as depicted for example in FIG. 2, the drive unit 10 makes a series of equal amplitude torque applications to the desired torque amplitude. Each distinct torque application is sometimes referred to as a torque pulse. The desired torque amplitude is a user selectable parameter and is indicated at 32 in FIG. 2. The torque threshold is indicated at 34, at which point the unit 14 may begin monitoring the angle of turn and/or elapsed time of the torque applied.

Each torque application is separated by a user selected fixed time pause during which the power to drive unit 10 is reduced, preferably to zero power, and during which further gasket compression occurs.

Figure 3:
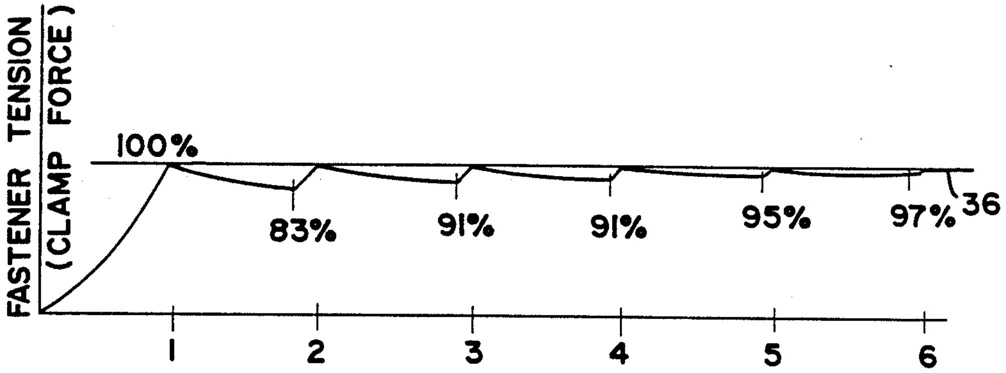
FIG. 3 is a graph showing the fastener clamp force over six torque applications.

FIG. 3 depicts a curve 36 representative of the clamping force on the gasket and/or the tension of the fastener. The clamping force is maximized at the same time as the applied torque peaks in FIG. 2. As previously described the gasket continues to compress even after the torque application has ceased due to the tension of the fastener. The clamping force exerted by the fastener decreases with time as depicted by the low points on the curve 36. With each successive torque application, the amount of gasket compression and decrease in clamping force following that torque application becomes progressively less. When enough torque applications have been applied, the clamp force decay is minimal. At this point the gasket has been compressed to a point where time dependent gasket compression can be disregarded.

Figure 4:
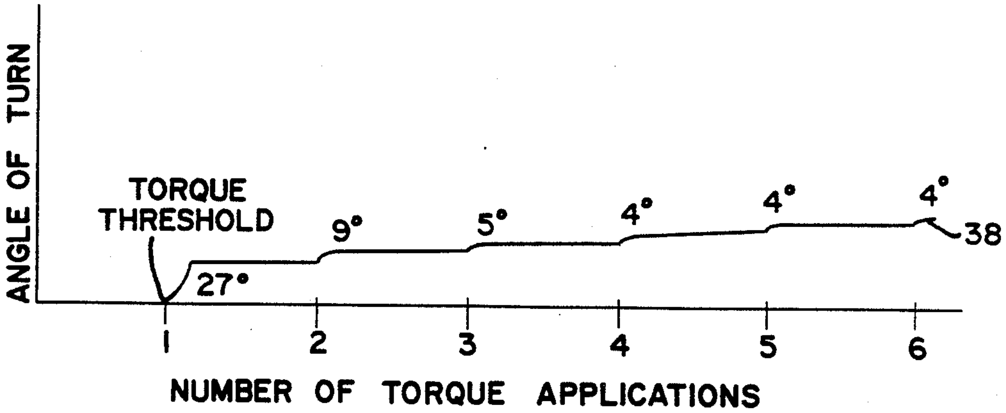
FIG. 4 is a graph showing the incremental and cumulative angle of turn of the fastener over six torque applications.

FIG. 4 depicts a representative example of the angle of turn curve 38 as cumulatively measured from a torque threshold point and which corresponds to the representative series of six torque applications. Representative incremental angles of turn are indicated corresponding to the individual torque applications of FIG. 2. The incremental angle of turn become progressively smaller after each torque application.

Between torque applications to the fastener, the energization or power to the drive unit is substantially reduced or shutdown, preferably to zero. This results in a substantial reduction in the power used during a typical tightening cycle. Along with the power reduction, a significant reduction in motor heating for electric drivers is realized when compared with the sustained power, power ramp, or cyclic torque pulse methods.

The monitor and control unit 14 has been designed to monitor and control the tightening process. Operating parameters such as the desired torque amplitude and the pause time between successive applications of torque are selectable by the user. The tension-related control parameters such as angle of turn limit, elapsed time limit or values calculated from angle and elapsed time that are used for feedback to control and monitor the tightening process are also user selectable. These parameters permit considerable flexibility and high reliability in control of the tightening process. The tightening process can also be monitored based on the measured tension-related variables such as angle of turn increments, elapsed time of increments, total cumulative angle of turn and number of torque pulses applied being within preselected ranges. Diagnosis of errors such as a missing gasket, too many gaskets, or gaskets that are too soft or too hard can be displayed for each fastener.

It should be noted that this diagnosis is possible using practical time pause limits; because the relaxation of the joint due to gasket compression occurs at an extremely rapid rate after tightening of the joint is stopped. Even though complete relaxation may take 24 hours or more, the initial relaxation rate is sufficiently rapid to allow significant relaxation to occur within a time pause lasting only a fraction of a second.

For a given combination of joint components, fasteners, and gasket, gasket compression will be determined by the elastic tension stresses created in the fasteners by tightening. Since these tension stresses will be directly proportional to the tension-related variables such as angle of turn and elapsed time, gasket compression is clearly dependent upon conditions defined by these variables.

Figure 5:
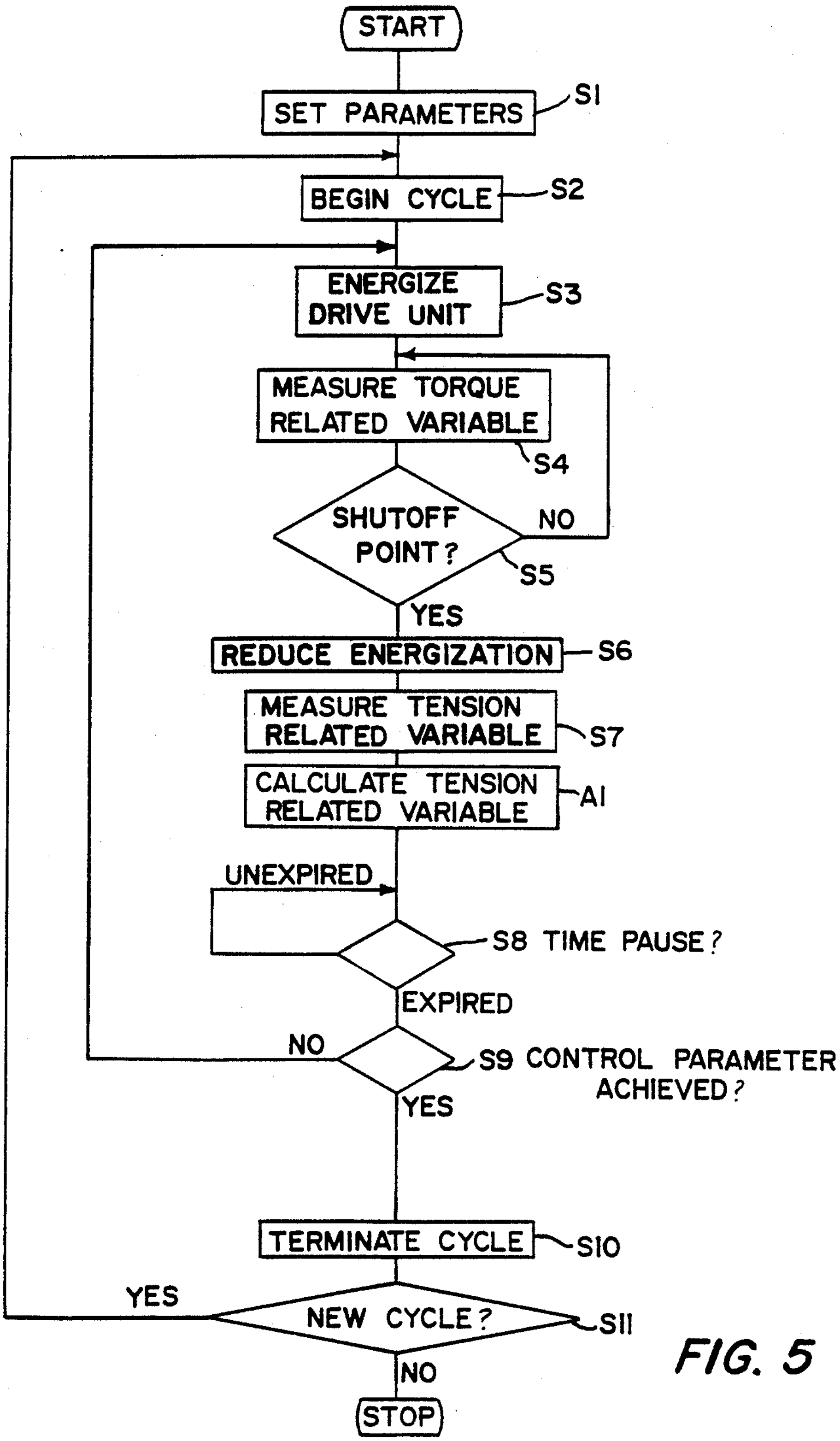
FIGS. 5, 6 and 7 are flow charts depicting control embodiments of the invention.

Referring to the flow chart as shown in FIG. 5, the operation of the preferred embodiment of the system will now be described. In Step S1, the operating parameters such as the torque-related shutoff point and the fixed pause time between torque applications are selected by the user. Additionally, the tightening feedback control parameters such as the incremental angle of turn limit or the incremental elapsed time limit for a torque application are selected. Other operating and feedback control parameters for different embodiments of this invention that are selected during this step will be described later in conjunction with those embodiments.

A tightening cycle begins in Step S2. The drive unit 10 is energized in S3 and rotational force is applied to the fastener. A torquer-related variable, such as torque or motor current is measured in Step S4. The drive unit continues to apply torque to the fastener until the torque related shutoff point is reached in S5. When the desired torque is achieved, the monitor and control unit 14 issues a shutdown command S6. The power to the drive unit is reduced, preferably to zero power.

A tension-related variable such as incremental angle of turn or incremental elapsed time is measured in Step S7. Reduced power is maintained for the drive system until the fixed pause time has expired in Step S8.

Fastener tension and gasket compression is evaluated in Step S9. In this embodiment the measured tension-related variable such as incremental angle of turn or incremental elapsed time of the torque application is compared to the preselected tension-related control limit. If the control limit is reached, that is if the measured incremental angle of turn or the incremental elapse time is less than or equal to the preselect control limit, the tightening cycle is terminated in Step S10. If the control limit has not been reached, the cycle returns to Step S3 and repeats through Step S9. After a cycle is completed, a decision to continue with a new cycle is made in Step S11.

A variation of the first preferred embodiment is also shown in FIG. 5. This method differs from the method of the preferred embodiment in that a tension-related value is calculated in Step A1 from the measured tension-related variable. For example, the tension-related value may be the slope value calculated by dividing the incremental torque-related variable by the corresponding incremental tension-related variable. Specifically, the torque-related variable used in the calculations can be the torque applied as measured directly by the torque detector 16 or motor current as measured by the current detector 18. The tension-related variable can be either angle of turn or elapsed time as measured in Step S7.

For this variation of the first embodiment, the control parameter which is preselected in Step S1 would be specifically related to the value calculated in Step A1. Also in Step S9 the control parameter is achieved for this variation when the calculated value is equal to or greater than the preselected control parameter. Since the measured torque-related variable will be relatively constant, the slope value will increase as the gasket compresses. Thus in Step S9, if the control parameter is achieved, that is if the slope value of the change in the torque related variable divided by the change in the measured tension-related variable (either angle of turn or elapsed time) is equal to or greater than the preselected control parameter, the cycle is terminated in Step S10. If the control limit is not achieved, the cycle returns to Step S3 and repeats through Step S9.

As noted above, for essentially constant speed electric motor drive units 10, the electrical current drawn by the motor has a direct correlation to the output torque produced by the motor. As the torque requirement increases, so does the electric current required. Thus the change in electric current from the start of torque application or from the torque threshold point until torque shutoff may be used as the torque-related variable. Likewise, for an air motor, the inlet air pressure could be measured and used as the torque-related variable.

Figure 6:
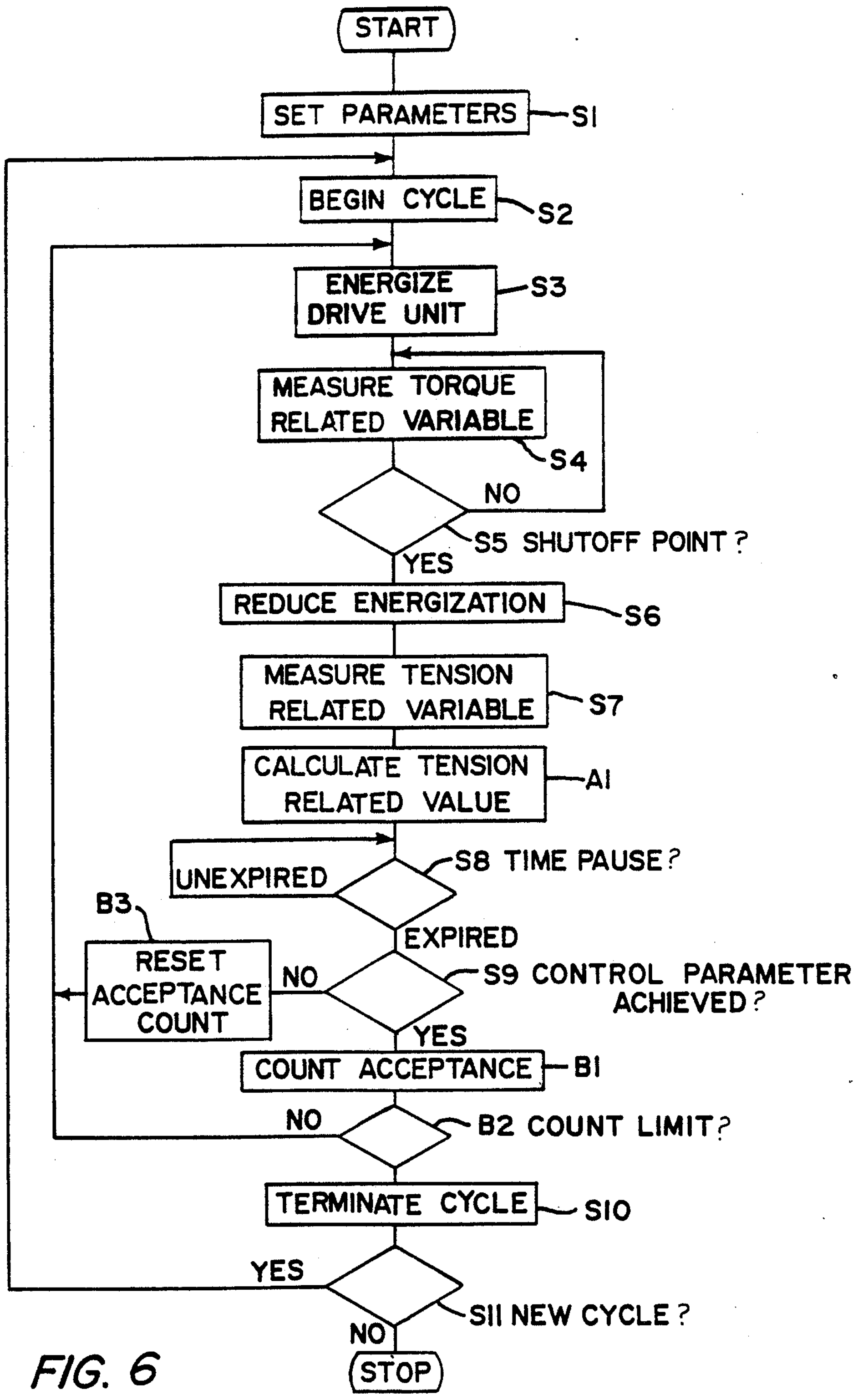

A second embodiment is depicted in the flow chart of FIG. 6. The procedure for determining cycle termination differs from that shown in FIG. 5. The method requires that the control parameter be achieved and have little change for a predefined number of succeeding torque applications before the tightening cycle is ended. In a measured tension-related variable (angle of turn or elapsed time), or in a variation similar to that disclosed in the first embodiment, a calculated tension-related value (slope value) can be used to determine if the control parameter is achieved.

Specifically, when the control parameter is achieved in Step S9, the achievement is counted in Step B1. In Step B2, the count is compared to a count limit preselected in Step S1. If the limit is reached, the cycle ends in Step S10. If the count limit is not met, the cycle returns to Step S3 and repeats through Step S9. Note that if the control parameter is not achieved at any time in Step S9 the count is reset to zero in Step B3 before repeating Steps S3 through S9.

Figure 7:
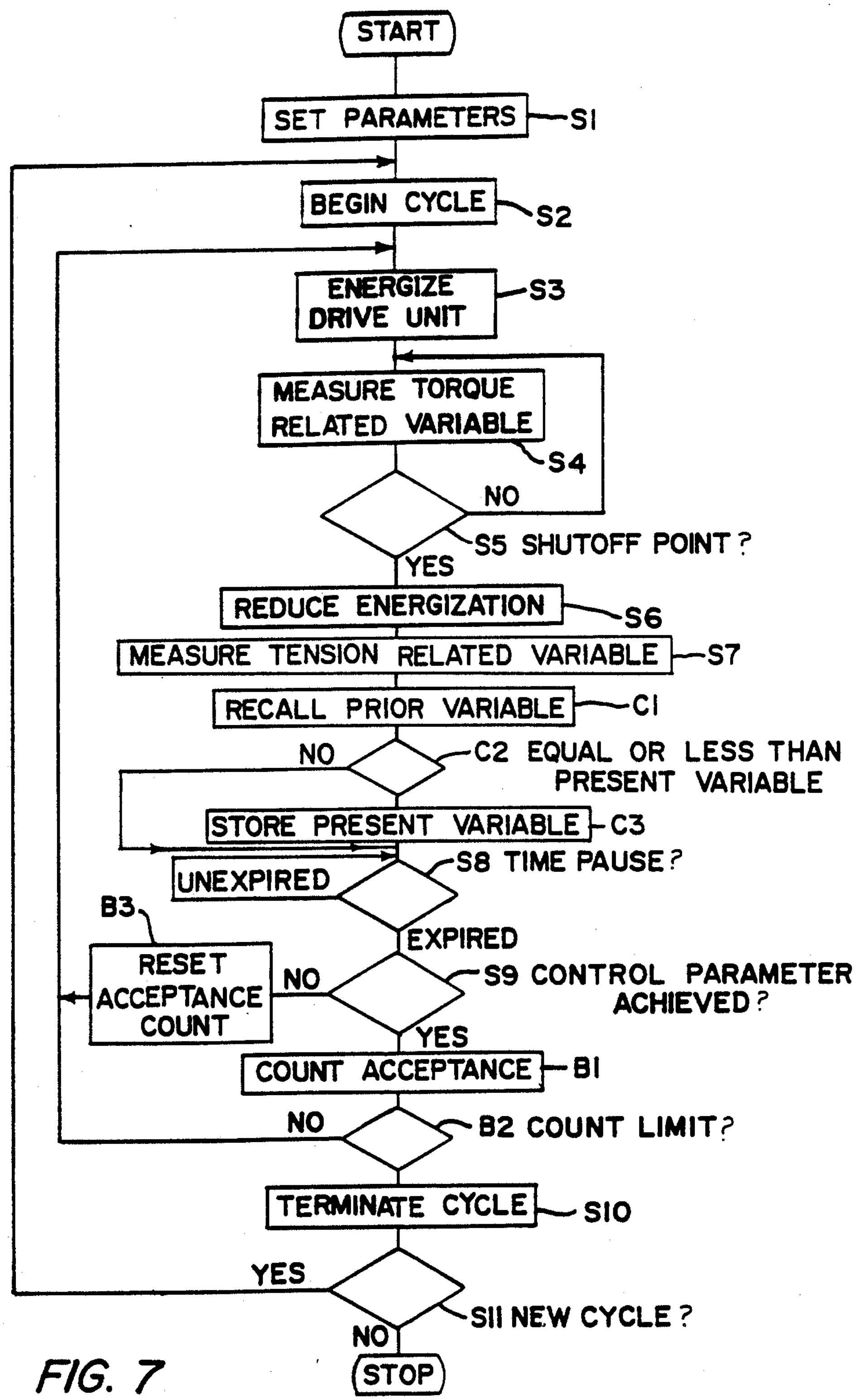

A third embodiment is depicted in the flow chart of FIG. 7. The method differs from the two previous embodiments in FIGS. 5 and 6 in that the control parameter of Step S9 is not preselected. Rather additional torque applications are applied until the amount of change from one measured variable to the measured variable of the next torque application is negligible. A preselected control parameter is not selected in S1. Rather this embodiment dynamically determines acceptable gasketed joint tightening when the measured variables are within a preselected range of variable values.

In Step C1, the prior stored variable is recalled. In Step C2, the present measured variable is compared to the prior variable. In Step C3, the lesser variable is maintained in the system memory for recall in Step C1 and for use in determining the control parameter of Step S9.

In Step S9 if the measured variable is essentially equal (i.e., within a preselected range as selected in Step S1) to the stored variable, the control parameter is achieved and the counter in Step B1 is started. When a user defined number of successive torque applications is counted in Step B2, each having a corresponding measured tension-related variable essentially equal (negligible change) to the minimum variable detected, the tightening cycle is terminated.

A variation of the third embodiment can also use the calculated tension-related value. In Step C3 the greater value is maintained in the memory. Thus in Step S9, if the calculated value is essentially equal to the stored value, a counter is started. When a user defined number of successive torque applications is counted in Step B2, each having a corresponding calculated tension-related value essentially equal to the maximum value detected, the tightening cycle is terminated.

Figure 8:
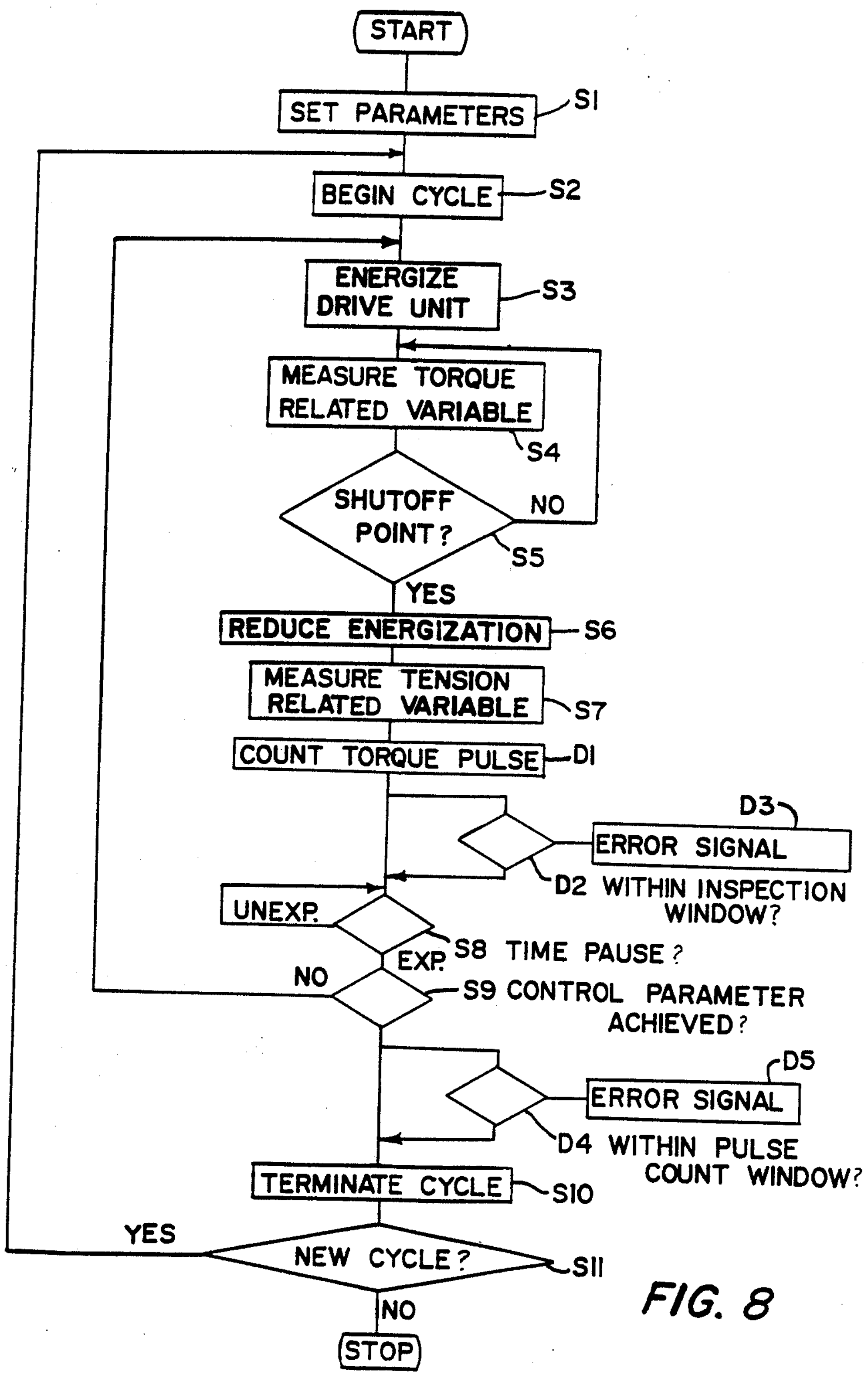
FIG. 8 is a flow chart depicting the monitoring feature of the invention.

Referring now to FIG. 8, a flow chart discloses two monitoring or inspection loops that can be used in conjunction with any torque pulse fastening cycle. The monitoring is disclosed here with the first embodiment of the invention, although it could also be used with the second and third embodiments of this invention, as well as the Torque Pulse Tightening Method in U.S. patent application Ser. No. 048,442 previously described.

The monitoring, while the fastener is being tightened, compares the tension-related variable (or value) to a user defined window corresponding to the respective torque application.

More specifically, in Step D1 the number of torque applications is counted. In Step D2, the tension-related variable for that number of torque applications is compared to a user definable window (i.e., the angle increment is compared to the range between and including high and low angle limits). The monitoring system can determine if the gasket material is missing or is too hard for example when the angle increment is too small. The monitoring system can determine if too many gaskets are present or if the gasket material is too soft, for example if the angle increment is too large. An error signal can be automatically produced in Step D3.

In a likewise manner the elapsed time of a torque application can be monitored to determine the quality of the tightening process. Also the calculated tension-related value can be monitored, with a gasket that is missing or too hard indicated by a slope value that is larger than the range and a gasket that is too soft or too many indicated by a slope value that is smaller than the range.

Another method of monitoring fastener tightening is to compare the total accumulated angle for a fixed number of torque applications to a user defined window. A low total accumulated angle indicates missing or too hard gaskets. A high total accumulated angle indicates too many or too soft gaskets.

Another monitoring function that can be performed by the present invention is an end of cycle inspection. In Step D1 a count of the number of torque applications required to complete the joint tightening is started. A fairly repeatable joint condition will result in a repeatable number of torque applications. A user definable count window in Step D4 will enable the monitoring system to determine that a gasket is missing or is too hard when the total number of torque applications is below the user defined window. A total number of torque applications above user defined limits indicates too many or too soft gaskets.

The significant feature of the present system is its ability to provide feedback information for controlling and monitoring the tensioning process.

Changes and modifications in the specifically described embodiments can be carried out without departing from the scope of the invention which is intended to be limited only by the scope of the appended claims.

I claim:

1. A method of applying tension to a threaded fastener for a gasketed joint comprising the steps of:
a. powering a drive unit to apply torque to the fastener;
b. measuring a torque-related variable;
c. comparing the torque-related variable to a preselected shutoff point;
d. reducing power to the drive unit when the shutoff point is reached;
e. measuring a tension-related variable by measuring the incremental elapsed time for each torque application and comparing said elapsed time to a preselected time limit determined by characteristics of said joint and gasket;
f. maintaining reduced power to the drive unit until a preselected time pause expires; and
g. applying additional torque applications to the fastener by repeating steps a through g until the tension-related variable satisfies a preselected condition related to gasket compression.

2. The method of claim 1 wherein the condition related to gasket compression comprises the measured incremental elapsed time being equal to or less than a preselected incremental elapsed time limit.

3. The method of claim 1 wherein the condition related to gasket compression comprises the measured incremental elapsed time being equal to or less than a preselected incremental elapsed time limit for a preselected number of successive torque applications.

4. The method of claim 1 wherein the condition related to gasket compression comprises a preselected number of measured incremental elapsed times for successive torque applications being within a preselected range.

5. A method of applying tension to a fastener for a gasketed joint comprising the steps of:
a. powering a drive unit to apply torque to the fastener;
b. measuring a torque-related variable;
c. comparing the torque-related variable to a preselected shutoff point;
d. reducing power to the drive unit when the shutoff point is reached;
e. measuring a tension-related variable by measuring the incremental elapsed time for each torque application and comparing said variable to a preselected limit determined by characteristics of said joint and gasket;
f. calculating a slope value by dividing the incremental torque-related variable by the corresponding incremental tension-related variable for each torque application;
g. maintaining reduced power to the drive unit until a preselected time pause expires; and
h. applying additional torque applications to the fastener by repeating steps a through h until the tension-related value satisfies a preselected condition related to gasket compression.

6. The method of claim 5 wherein the condition related to gasket compression comprises the calculated slope value exceeding a preselected slope limit.

7. The method of claim 5 wherein the condition related to gasket compression comprises the calculated slope value exceeding a preselected slope limit for a preselected number of successive torque applications.

8. The method of claim 5 wherein the condition related to gasket compression comprises a preselected number of calculated slope values for successive torque applications being within a preselected range.

9. A method of applying tension to a threaded fastener for fastening a gasketed assembly comprising the steps of:
a. powering a drive unit to apply torque to the fastener;

b. measuring a variable related to the torque applied to the fastener;

c. comparing the measured torque-related variable to a preselected torque-related shutoff point;

d. reducing the power to the drive unit when the shutoff point is reached;

e. measuring a variable related to fastener tension by measuring the incremental elasped time of the torque application;

f. maintaining reduced power to the drive unit until a preselected time pause expires;

g. comparing the measured tension-related variable to a preselected control limit and determining if its value is within a preselected range;

h. applying additional torque to the fastener by repeating steps a through h when the measured tension-related variable has not achieved the preselected control limit; and i. terminating application of additional torque to the fastener when the measured tension-related variable has achieved the preselected control limit.

10. A method of applying tension to a threaded fastener for fastening a gasketed assembly comprising the steps of:

a. powering a drive unit to apply torque to the fastener;

b. continuously measuring a variable related to the torque applied to the fastener by measuring the motor current drawn by the drive unit;

c. continuously comparing the measured torque-related variable to a preselected torque-related shutoff point;

d. reducing the power to the drive unit when the shutoff point is reached;

e. measuring a variable related to fastener tension by measuring the incremental angle of turn of the fastener for each torque application and determining if it is within a preselected range;

f. calculating a slope value by dividing the incremental torque-related variable by the corresponding incremental tension-related variable;

g. maintaining reduced power to the drive unit until a preselected time pause expires;

h. comparing the tension-related value to a preselected control limit;

i. applying additional torque to the fastener by repeating steps a through i when the calculated tension-related value has not achieved the control limit; and j. terminating application of additional torque to the fastener when the calculated tension-related value has achieved the control limit.

11. The method of claim 10 wherein the step of measuring a tension-related variable comprises measuring the incremental elapsed time for each torque application.

12. A method of applying tension to a threaded fastener for fastening a gasketed assembly comprising the steps of:

a. powering a drive unit to apply torque to the fastener;

b. continuously measuring a variable related to the torque applied to the fastener;

c. continuously comparing the measured torque-related variable to a preselected torque-related shutoff point;

d. reducing the power to the drive unit when the shutoff point is reached;

e. measuring a variable related to fastener tension;

f. maintaining reduced power to the drive unit until a preselected time pause expires;

g. comparing the measured variable related to fastener tension to a prior measured variable;

h. retaining the lesser valued variable;

i. applying additional torque to the fastener by repeating steps a through i until the measured variable is within a preselected range of the lesser variable;

j. counting each acceptable occurrence when the measured variable is within the preselected range;

k. comparing the acceptance count to a preselected count limit;

l. repeating steps a through l when the acceptance count has not reached the preselected count limit; and m. terminating application of additional torque to the fastener when the count limit is reached.

13. The method of claim 12 further comprising the step of determining if the tension-related variable is within a preselected inspection range.

14. The method of claim 13 wherein the step of measuring a tension-related variable comprises measuring the incremental angle of turn of the fastener for each torque application.

15. The method of claim 13 wherein the step of measuring a tension-related variable comprises measuring the incremental elapsed time for each torque application.

16. In combination with a method for applying tension to a threaded fastener for a gasketed joint, a method of monitoring the success of a gasketed joint tightening cycle comprising the steps of:

measuring the incremental elapsed time for each torque application; and determining if the measured incremental elapsed time is within a preselected inspection range.

* * * * *